(12) United States Patent  
Chang

(10) Patent No.: US 8,576,332 B2  
(45) Date of Patent: Nov. 5, 2013

(54) LCD APPARATUS WITH CAMERA MODULE, AND METHOD OF MAKING SAME

(75) Inventor: Jen-Tsorng Chang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 289 days.

(21) Appl. No.: 12/777,262

(22) Filed: May 11, 2010

(65) Prior Publication Data

US 2011/0149139 A1   Jun. 23, 2011

(30) Foreign Application Priority Data

Dec. 23, 2009 (CN) .......................... 2009 1 0312065

(51) Int. Cl.  
*H04N 5/225* (2006.01)

(52) U.S. Cl.  
USPC .......................................................... 348/373

(58) Field of Classification Search  
USPC ............... 349/177, 2, 187, 68, 65, 95; 257/444.443; 348/333.08, 308, 374; 445/24; 250/208.1; 174/257  
See application file for complete search history.

(56) References Cited

U.S. PATENT DOCUMENTS

| 5,336,879 | A  | * | 8/1994 | Sauer ........................ 250/208.1 |
| 5,617,131 | A  | * | 4/1997 | Murano et al. ................ 347/233 |
| 2005/0058052 | A1 | * | 3/2005 | Wada et al. ............. 369/112.24 |
| 2005/0183884 | A1 | * | 8/2005 | Su ................................. 174/257 |
| 2006/0043555 | A1 | * | 3/2006 | Liu ............................... 257/680 |
| 2007/0153177 | A1 | * | 7/2007 | Zhang et al. ................. 349/116 |

\* cited by examiner

*Primary Examiner* — Roberto Velez  
*Assistant Examiner* — Stephen Coleman  
(74) *Attorney, Agent, or Firm* — Altis & Wispro Law Group, Inc.

(57) ABSTRACT

An exemplary liquid crystal display apparatus includes a liquid crystal display device and a camera module. The liquid crystal display device includes a first glass substrate, a second glass substrate parallel to the first glass substrate, and a liquid crystal layer formed between the first glass substrate and the second substrate; and the camera module includes a lens, and an image sensor, wherein the image sensor is located between the first glass substrate and the second glass substrate, and is separated from the liquid crystal layer, and the lens is located on an opposite side of the first glass substrate to the image sensor, and an optical axis of the lens is aligned with a central normal of the image sensor.

18 Claims, 2 Drawing Sheets

LCD APPARATUS WITH CAMERA MODULE, AND METHOD OF MAKING SAME

BACKGROUND

1. Technical Field

The present disclosure relates to a liquid crystal display (LCD) apparatus packaged with a camera module, and a method of making the LCD apparatus.

2. Description of Related Art

LCD apparatus are widely used in mobile phones, or personal computers, and camera modules are also applied in these electronic apparatus.

A typical LCD apparatus and camera module combination is configured with the camera module adjacent to a display of the LCD apparatus which adds to the bulk of the apparatus. What is needed is an LCD apparatus with camera module embedded therein without an independent packaging space.

BRIEF DESCRIPTION OF THE DRAWINGS

Many aspects of the present LCD apparatus packaged with a camera module can be better understood with reference to the following drawings. The components in the drawings are not necessarily drawn to scale, the emphasis instead being placed upon clearly illustrating the principles of the present, LCD apparatus and method. Moreover, in the drawings, like reference numerals designate corresponding parts throughout the several views.

DETAILED DESCRIPTION

Figure 1:
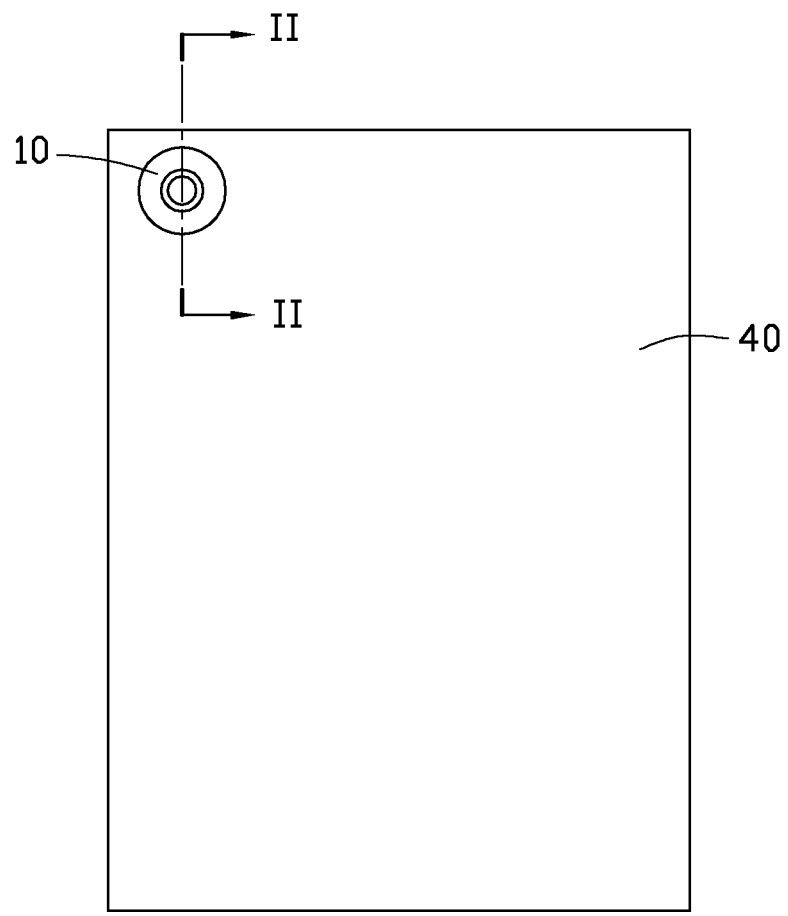
FIG. 1 is a perspective view of an LCD apparatus in accordance with an exemplary embodiment.
Figure 2:
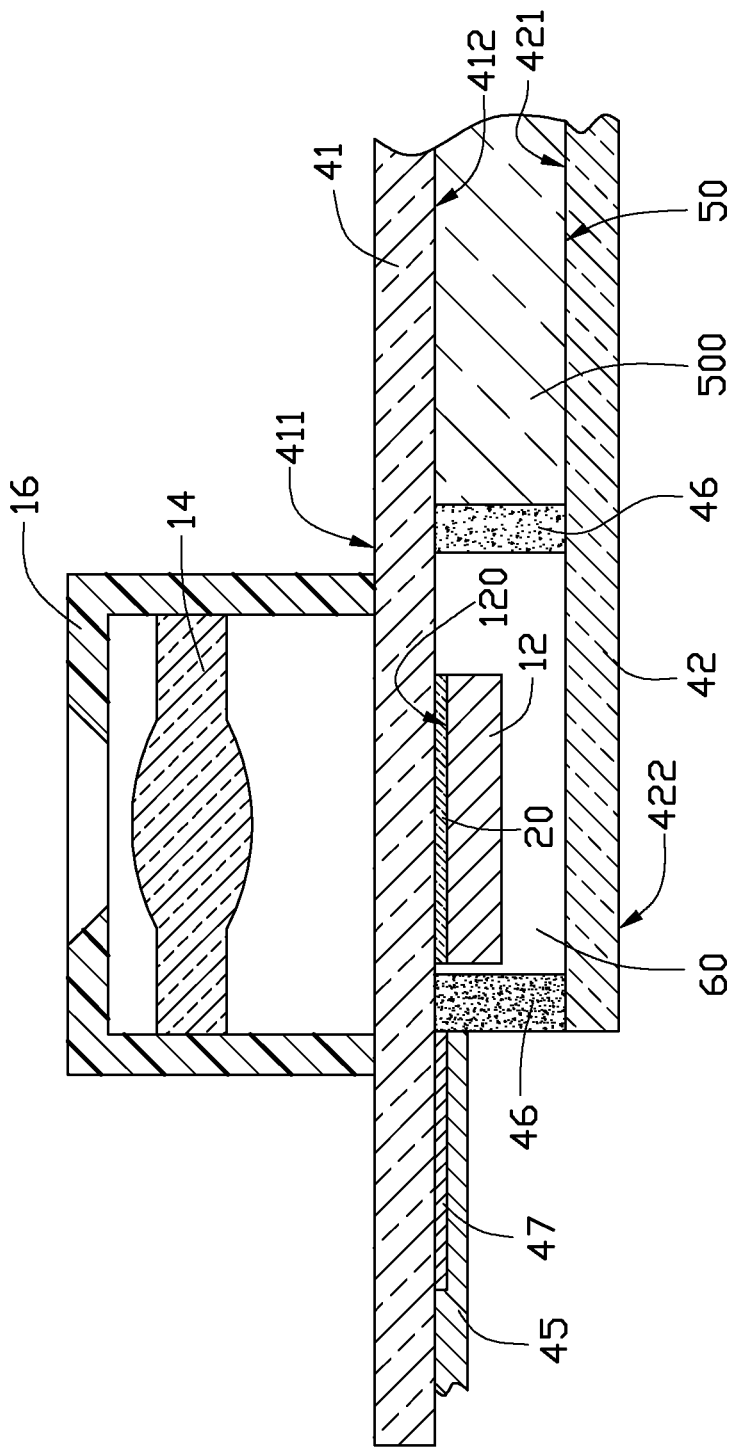
FIG. 2 is a sectional view in the direction of II-II shown in FIG. 1.

FIG. 1 and FIG. 2 show a liquid crystal display (LCD) apparatus 40 packaged with a camera module 10. The LCD apparatus 40 includes an external first glass substrate 41 laid over a second glass substrate 42 parallel to the first glass substrate 41. The first glass substrate 41 and the second glass substrate 42 need not be the same size. In this embodiment, the first glass substrate 41 overhangs the second glass substrate 42. The first glass substrate 41 has a first surface 411 and an opposite second surface 412 parallel to the first surface 411. The second glass substrate 42 has a third surface 421 and an opposite fourth surface 422 parallel to the third surface 421. The second surface 412 faces the third surface 421. The fourth side 422 is opposite to the displaying side. Some sealing elements 46 are applied to divide the space between the first glass substrate 41 and the second glass substrate 42 into a first closed space 50 and a second closed space 60. The sealing elements 46 can be made of epoxy resin, or atramentous polymer, or glue. The first closed space 50 accommodates liquid crystal 500 to form a liquid crystal layer. The liquid crystal layer defines a display area for the LCD apparatus 40. The second closed space 60 is adjacent to the first closed space 50 and is for having a part of the camera module 10 embedded therein.

The camera module 10 includes an image sensor 12 and a lens 14. The image sensor 12 is accommodated in the second closed space 60. The image sensor 12 has a light sensing surface 120. The lens 14 is located on an opposite side of the first glass substrate 41 to the image sensor 12, for example, the first surface 411, also defining a displaying side in this embodiment. An optical axis of the lens 14 is aligned with a central normal of the image sensor 12. A transparent conductive layer 20 is attached to the second surface 412 or the third surface 421. The image sensor 12 is attached to the transparent conductive layer 20. The transparent conductive layer 20 is configured for electrically connecting the image sensor 12 to some other unit, for example, a printed circuit board (PCB) 45, or a processor of the display apparatus 40. The transparent conductive layer 20 can be made of indium-tin oxide material or the like. The first glass substrate 41 keeps the image sensor 12 from pollution of dust and small particles. Therefore, a cover glass plate (usually appearing in traditional process) covering the image sensor 12 is not necessary.

The printed circuit board 45 has a number of interdigitated electrodes 47, and the interdigitated electrodes 47 are electrically connected to the transparent conductive layer 20. The printed circuit board 45 may be located adjacent the first glass substrate 41 or the second glass substrate 42.

The camera module 10 further has a barrel 16 to receive the lens 14 and other possible optical units, such as a filter. The barrel 16 is glued on the first surface 411 of the first glass substrate 41.

In another embodiment, the lens 14 can be a kind of wafer level packaged lens without a barrel can be directly embossed on the first glass substrate 41. The embossing method, for example, has following steps, first, put transparent material in a liquid or plastically deformable state on the first surface 411 of the first glass substrate 41; second, mold an optical structure, for example, a lens, on the transparent material; third, cure the transparent material with ultraviolet light and remove the mold. Thus, a lens is directly embossed on the first glass substrate 41.

The lens 14 can be also arranged on an opposite side of the LCD apparatus to the displaying side thereof, for example, the fourth surface 422, to face a different direction when capturing images.

The camera module 10 is located in a corner region of the LCD display apparatus 40 or other place except the display area of the LCD apparatus 40.

The camera module 10 can be packaged in the LCD apparatus 40 by following steps.

First, a first glass substrate 41 and a second glass substrate 42 are provided. The first glass substrate 41 has a first surface 411 and a second surface 412 parallel to the first surface 411. The second glass substrate 42 has a third surface 421 and a second surface 422. The third surface 421 is divided into two parts by some sealing elements 46. One part defines a display area, and the other part defines an area for locating a camera module 10.

Second, a transparent conductive layer 20 is attached to the second surface 412. An image sensor 12 at the second surface 412 is electrically connected with the transparent conductive layer 20. Alternatively, the transparent conductive layer 20 could be attached to the third surface 421. The image sensor 12 at the third surface 412 could be electrically connected with the transparent conductive layer 20. The transparent conductive layer 20 could also be attached to the second surface 412, and the image sensor 12 is arranged at the third surface 421. It is possible that the transparent conductive layer 20 is attached to the third surface 421, and the image sensor 12 is located at the second surface 412.

Third, the first glass substrate 41 is arranged on the second glass substrate 42. Because the first glass substrate 41 can contact with the sealing elements 46, a first closed space 50 and a second closed space 60 are formed between the first glass substrate 41 and the second glass substrate 42.

Fourth, liquid crystal 500 is introduced into the first closed space 50 to form a liquid crystal layer. The transparent conductive layer 20 is electrically connected to a printed circuit board 45 through some interdigitated electrodes 47. Now the image sensor 12 is located inside the second closed space 60.

Fifth, a lens 14 is arranged on the first surface 411 of the first glass substrate 41. An optical axis of the lens 14 is aligned with the central normal of the image sensor 12. Besides the lens 14, a barrel 16 can be also glued on the first surface 411, and the lens 14 is placed inside the barrel 16.

In another alternative embodiment, the lens 14 can be embossed on the first glass substrate 41 without any barrel.

The camera module 10 employs the first glass substrate 41 as a glass cover plate to keep the image sensor 12 from pollution of dust or small particles, so the number of elements needed during the packaging process decreases. Because the camera module 10 is embedded in the LCD apparatus 40 with the image sensor 12 covered by one glass substrate of the LCD apparatus 40, an independent packaging space, such as a frame, is not needed, the packaging volume decreases. Or the frame surrounds the LCD apparatus 40 can be narrower than before, thus the display area seems bigger.

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. A liquid crystal display apparatus comprising:
    a liquid crystal display device comprising:
        a first glass substrate;
        a second glass substrate parallel to the first glass substrate;
        a plurality of sealing elements located between the first glass substrate and the second glass substrate, each of the sealing elements supporting both the first glass substrate and the second glass substrate; and
        a liquid crystal layer formed between the first glass substrate and the second glass substrate; and
    a camera module comprising:
        a lens; and
        an image sensor;
    wherein the image sensor is located between the first glass substrate and the second glass substrate, the image sensor and the liquid crystal layer are horizontally arranged one after the other along a lengthwise direction of the first and second glass substrates, and the image sensor is separated from the liquid crystal layer by only one of the sealing elements; and
    the lens is located on an opposite side of the first glass substrate to the image sensor, and an optical axis of the lens is aligned with a central normal of the image sensor.

2. The liquid crystal display apparatus according to claim 1, further comprising a transparent conductive layer, wherein the first glass substrate has a first surface and an opposite second surface parallel to the first surface, the second glass substrate has a third surface and an opposite fourth surface parallel to the third surface, the second surface faces the third surface, the transparent conductive layer is disposed between the second surface and the third surface, and the image sensor is electrically connected to the transparent conductive layer.

3. The liquid crystal display apparatus according to claim 2, further comprising a printed circuit board, wherein the transparent conductive layer is electrically connected to the printed circuit board, and attached to the second surface or the third surface; and the image sensor is attached to the transparent conductive layer.

4. The liquid crystal display apparatus according to claim 2, wherein the camera module further comprises a barrel located on the first surface, and the lens is accommodated inside the barrel.

5. The liquid crystal display apparatus according to claim 2, wherein the lens is arranged on a displaying side of the liquid crystal display apparatus.

6. The liquid crystal display apparatus according to claim 2, wherein the lens is arranged on an opposite side of the liquid crystal display apparatus to a displaying side thereof.

7. The liquid crystal display apparatus according to claim 1, wherein each of the sealing elements is selected from the group consisting of epoxy resin, polymer and glue.

8. The liquid crystal display apparatus according to claim 1, wherein the liquid crystal layer is in contact with both the first glass substrate and the second glass substrate.

9. A method of making a liquid crystal display apparatus, comprising:
    providing a first glass substrate;
    providing a second glass substrate parallel to the first glass substrate;
    providing an image sensor;
    attaching the image sensor onto the first glass substrate;
    arranging the first glass substrate on the second glass substrate by arranging a plurality of sealing elements between the first glass substrate and the second glass substrate to support the first and second glass substrates in a manner that a space between the first and second glass substrates is separated into a first closed space and a second closed space arranged one after the other along a lengthwise direction of the first and second glass substrates, the first closed space being separated from the second closed space by only one of the sealing elements, with the image sensor received in the first closed space between the first and second glass substrates;
    forming a liquid crystal layer in the second closed space between the first glass substrate and the second glass substrate; and
    arranging a lens on an opposite side of the first glass substrate to the image sensor in a manner that an optical axis of the lens is aligned with the central normal of the image sensor.

10. The method according to claim 9, further comprising attaching a transparent conductive layer to the first glass substrate, and electrically connecting the transparent conductive layer to the image sensor.

11. The method according to claim 9, wherein the lens is embossed on the first glass substrate.

12. The method according to claim 9, further comprising fixing a barrel on the first glass substrate to accommodate the lens.

13. The method according to claim 9, wherein each of the sealing elements is selected from the group consisting of epoxy resin, polymer and glue.

14. The method according to claim 9, wherein the second closed space is completely filled with the liquid crystal layer.

15. A liquid crystal display apparatus comprising:
    a liquid crystal display device comprising:
        a first glass substrate;
        a second glass substrate parallel to the first glass substrate;
        a plurality of sealing elements located between the first glass substrate and the second glass substrate and in contact with the first glass substrate and the second glass substrate; and
        a liquid crystal layer formed between the first glass substrate and the second glass substrate; and a camera module comprising:
  a lens; and
  an image sensor;
wherein the image sensor is located between the first glass substrate and the second glass substrate;
a space between the first glass substrate and the second glass substrate is separated into a first closed space and a second closed space arranged one after the other along a lengthwise direction of the first and second glass substrates by only one of the sealing elements, the liquid crystal layer is received in the first closed space, and the image sensor is received in the second closed space; and
the lens is located on an opposite side of the first glass substrate to the image sensor, and an optical axis of the lens is aligned with a central normal of the image sensor.

16. The liquid crystal display apparatus according to claim 15, wherein each of the sealing elements is selected from the group consisting of epoxy resin, polymer and glue.

17. The liquid crystal display apparatus according to claim 15, wherein the first and second closed spaces are arranged one after the other along a lengthwise direction of the first and second glass substrates.

18. The liquid crystal display apparatus according to claim 15, wherein the second closed space is fully filled with the liquid crystal layer.

* * * * *